US012706416B1

(12) United States Patent
Varrey et al.

(10) Patent No.: US 12,706,416 B1

(45) Date of Patent: Aug. 11, 2026

(54) FLOATING INTERCONNECT SOLUTION FOR SMALL DE-MATE CONNECTORS

(71) Applicant: AMD Design, LLC, Wilmington, DE (US)

(72) Inventors: Mahesh Kumar Varrey, Secaucus, NJ (US); Chen An, Secaucus, NJ (US)

(73) Assignee: AMD Design, LLC, Wilmington, DE (US)

( * ) Notice: Subject to any disclaimer, the term of this patent is extended or adjusted under 35 U.S.C. 154(b) by 934 days.

(21) Appl. No.: 17/991,108

(22) Filed: Nov. 21, 2022

(51) Int. Cl.
*H01R 13/621* (2006.01)
*H01R 13/629* (2006.01)
*H01R 13/631* (2006.01)

(52) U.S. Cl.
CPC ..... *H01R 13/621* (2013.01); *H01R 13/62972* (2013.01); *H01R 13/6315* (2013.01); *H01R 13/62938* (2013.01)

(58) Field of Classification Search
CPC ............ H01R 13/62972; H01R 13/621; H01R 13/62938; H01R 13/6315
USPC ......................... 439/310, 361, 362, 364, 246
See application file for complete search history.

(56) References Cited

U.S. PATENT DOCUMENTS 4,865,560 A * 9/1989 Thomas ............... H01R 13/629 439/341
4,954,085 A * 9/1990 Inoue ................. H01R 13/6215 439/364
5,092,774 A * 3/1992 Milan .................... G01R 1/045 324/755.05
5,328,388 A * 7/1994 Fust ....................... H01R 13/74 439/364
5,383,790 A * 1/1995 Kerek .................. H01R 13/635 439/248
5,401,183 A * 3/1995 Tan .................... H01R 12/7005 439/135
5,647,758 A * 7/1997 Ichikawa ........... H01R 13/6215 439/364
5,652,695 A * 7/1997 Schmitt ................ G11B 33/128
5,676,560 A * 10/1997 Endo ....................... B60L 53/16 439/310
5,859,766 A * 1/1999 Van Scyoc ........... H05K 5/0052 361/752

(Continued)

FOREIGN PATENT DOCUMENTS

KR 101462664 B1 * 11/2014 ....... H01R 13/62972

*Primary Examiner* — Marcus E Harcum
(74) *Attorney, Agent, or Firm* — Dergosits & Noah LLP; Todd A. Noah

(57) ABSTRACT

Embodiments described within disclose a floating interconnect in which two connectors on a carrier float a small amount in the direction of connection. Cam handles on the carrier provide leverage that overcomes an initial mating force and lever the carrier connections most or all of the way to full seat against the mating board connectors. Then, for each connector, a thumb screw passes through the connector and is screwed into the mating connector. As the thumbscrew is fastened, a shoulder on the thumbscrew draws the connected down and fully seats it against the board connector with move of the carrier connector being accommodated by the float of the connector with respect to the carrier. This reduces or prevents the compressive stress on the carrier that would otherwise result from having the connections made solely by forcing the carrier against the mating connectors.

18 Claims, 13 Drawing Sheets

(56) References Cited

U.S. PATENT DOCUMENTS

| | | | | | |
|---|---|---|---|---|---|
| 5,975,953 | A * | 11/1999 | Peterson | H01R 13/6592 | 439/607.18 |
| 6,027,360 | A * | 2/2000 | Jenkins | H01R 13/6215 | 439/364 |
| 6,172,875 | B1 * | 1/2001 | Suzuki | H05K 7/1465 | 361/752 |
| 6,217,368 | B1 * | 4/2001 | Baron | H01R 13/629 | 439/378 |
| 6,261,122 | B1 * | 7/2001 | Richter | H01R 13/6315 | 439/477 |
| 6,592,387 | B2 * | 7/2003 | Komenda | H01R 13/6315 | 439/247 |
| 6,592,388 | B1 * | 7/2003 | Meiners | H05K 7/1454 | 439/310 |
| 6,736,659 | B1 * | 5/2004 | Wu | H01R 13/748 | 439/573 |
| 6,890,200 | B1 * | 5/2005 | Wu | H01R 13/6315 | 439/573 |
| 6,923,679 | B1 * | 8/2005 | Wu | H01R 13/6315 | 439/573 |
| 6,927,974 | B2 * | 8/2005 | Robillard | H01R 13/6315 | 439/246 |
| 7,037,131 | B1 * | 5/2006 | Chen | H01R 13/6215 | 439/372 |
| 7,083,462 | B1 * | 8/2006 | Chen | H01R 13/62966 | 439/372 |
| 7,485,003 | B2 * | 2/2009 | Mandrusov | H01R 13/6315 | 439/607.41 |
| 7,654,847 | B2 * | 2/2010 | Soubh | G01R 1/06733 | 439/329 |
| 8,342,867 | B2 * | 1/2013 | Murphy | B82Y 35/00 | 439/248 |
| 8,348,693 | B2 * | 1/2013 | Stowers | H01R 12/727 | 439/364 |
| 9,017,087 | B1 * | 4/2015 | Rossman | H01R 13/73 | 439/248 |
| 9,331,405 | B2 * | 5/2016 | Tsang | H01R 12/7047 | |
| 9,648,773 | B1 * | 5/2017 | An | G06F 1/187 | |
| 10,164,373 | B1 * | 12/2018 | Cheon | H05K 7/20781 | |
| 10,622,761 | B1 * | 4/2020 | Held | H01R 13/6315 | |
| 10,950,976 | B2 * | 3/2021 | Ding | G02B 6/3825 | |
| 10,958,014 | B1 * | 3/2021 | Martin | H01R 13/6215 | |
| 11,183,794 | B2 * | 11/2021 | Sawada | H01M 10/63 | |
| 11,373,689 | B1 * | 6/2022 | Woo | G11B 33/122 | |
| 11,381,034 | B2 * | 7/2022 | Kondo | H01R 13/5202 | |
| 11,488,638 | B1 * | 11/2022 | Anderson | G06F 1/187 | |
| 11,490,536 | B1 * | 11/2022 | An | H05K 7/1402 | |
| 11,683,905 | B1 * | 6/2023 | An | H05K 7/1409 | 361/679.02 |
| 11,996,649 | B1 * | 5/2024 | Carpenter | H01R 13/5213 | |
| 12,026,021 | B1 * | 7/2024 | Trotta | G06F 1/187 | |
| 12,167,560 | B1 * | 12/2024 | An | H05K 7/1489 | |
| 2002/0001989 | A1 * | 1/2002 | Friesen | H01R 13/6315 | 439/362 |
| 2004/0009697 | A1 * | 1/2004 | Clark | H01R 13/6215 | 439/362 |
| 2004/0214463 | A1 * | 10/2004 | Chen | H01R 12/7047 | 439/247 |
| 2005/0186831 | A1 * | 8/2005 | Barsun | G06F 1/183 | 439/362 |
| 2011/0053408 | A1 * | 3/2011 | Tsuruta | H01R 13/621 | 439/362 |
| 2013/0078844 | A1 * | 3/2013 | Eusterholz | H01R 9/18 | 439/362 |
| 2018/0006401 | A1 * | 1/2018 | Ishibashi | H01R 13/621 | |
| 2018/0014424 | A1 * | 1/2018 | Costello | H04Q 1/15 | |
| 2022/0190521 | A1 * | 6/2022 | Lutowsky, Jr. | H01R 13/639 | |
| 2022/0247125 | A1 * | 8/2022 | Kelley | H05K 7/1487 | |
| 2023/0137275 | A1 * | 5/2023 | Morgan | H01R 13/73 | 439/65 |
| 2023/0138913 | A1 * | 5/2023 | Morgan | H01R 12/75 | 439/65 |
| 2023/0402790 | A1 * | 12/2023 | Hellige | H01R 13/6581 | |

* cited by examiner

FLOATING INTERCONNECT SOLUTION FOR SMALL DE-MATE CONNECTORS

FIELD OF THE INVENTION

The present subject matter relates generally to connectors and in particular to blind connectors with high insertion forces.

BACKGROUND

A situation arises when a blind connection needs to be made between two circuit boards within a device. For example, a head interface board (HIB) may be stacked atop a mother board in a high performance computing (HPC) server, requiring a blind connection be made between connectors on either board. Such connections provide the following challenges: a high force is required to make each connection; the stack tolerance is uncertain because the HIB is mounted to a removable HIB tray and the motherboard is mounted to the chassis on a plane below the HIB; and the de-mating distance of the connectors is very small.

Thus, what is needed is an apparatus that: reduces the force necessary to make the connection; compensates for stack tolerances; and prevents movement that may cause the undesired de-mating of the connectors.

BRIEF DESCRIPTION OF THE DRAWINGS

The embodiments are illustrated by way of example and not limitation in the accompanying drawings, in which like references indicate similar elements, and in which.

DETAILED DESCRIPTION

Embodiments described within disclose a carrier tray that slides into a slot within a server. When in position, a first connector of the carrier opposes a mating connector of a first board and a second connector of the carrier opposes a mating connector of a second board. In an embodiment, the first and second connectors are connected to each other by cabling. Each connector on the carrier is connected to the carrier by a tray that floats in the direction of connection. Cam handles on the carrier provide leverage that overcomes an initial mating force and lever the carrier connections most or all of the way to seat against the mating board connectors. Then, for each connector, a thumb screw that passes through the connector may be screwed into the mating connector to fully seat or simply secure the connection. Any movement of the connector caused by the thumb screw is accommodated by the float of the tray. This float reduces or prevents the stress on the carrier that would otherwise result from having the connections made solely by forcing the carrier against the mating connectors.

Figure 1A:
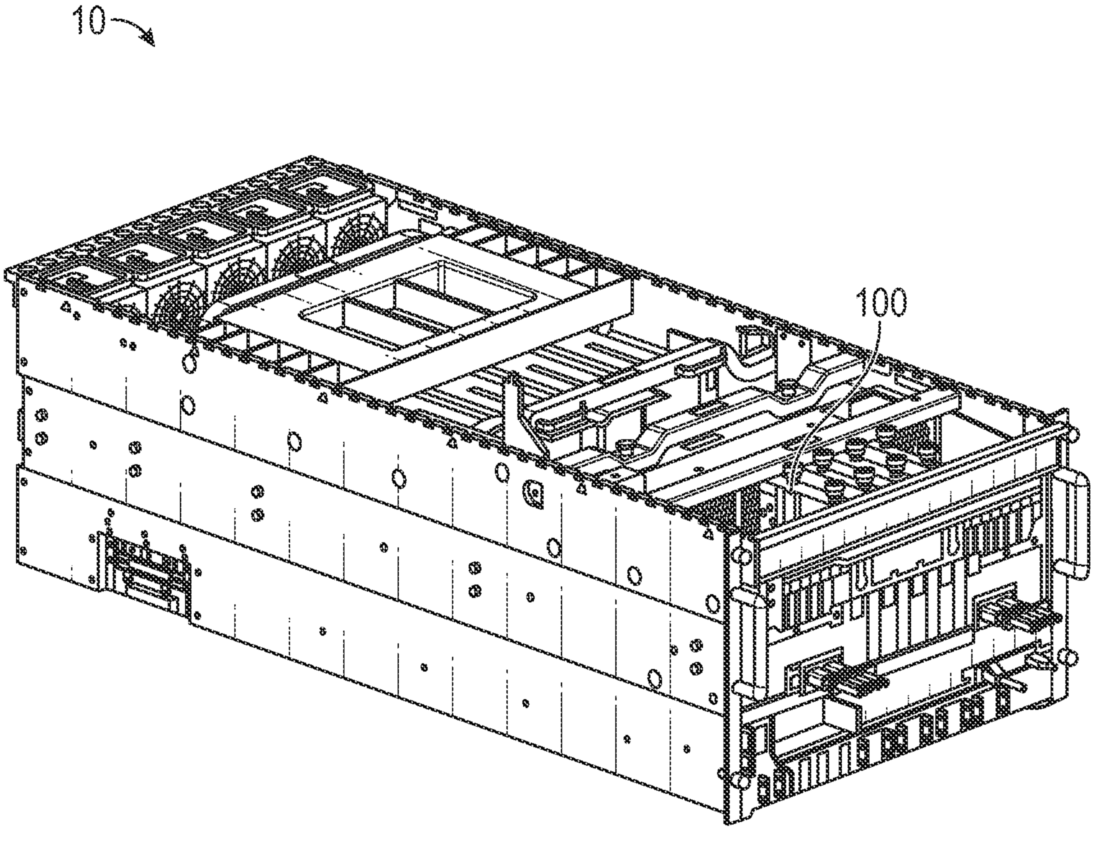
FIG. 1A is a perspective view of an embodiment of a floating interconnect solution in a server.
Figure 1B:
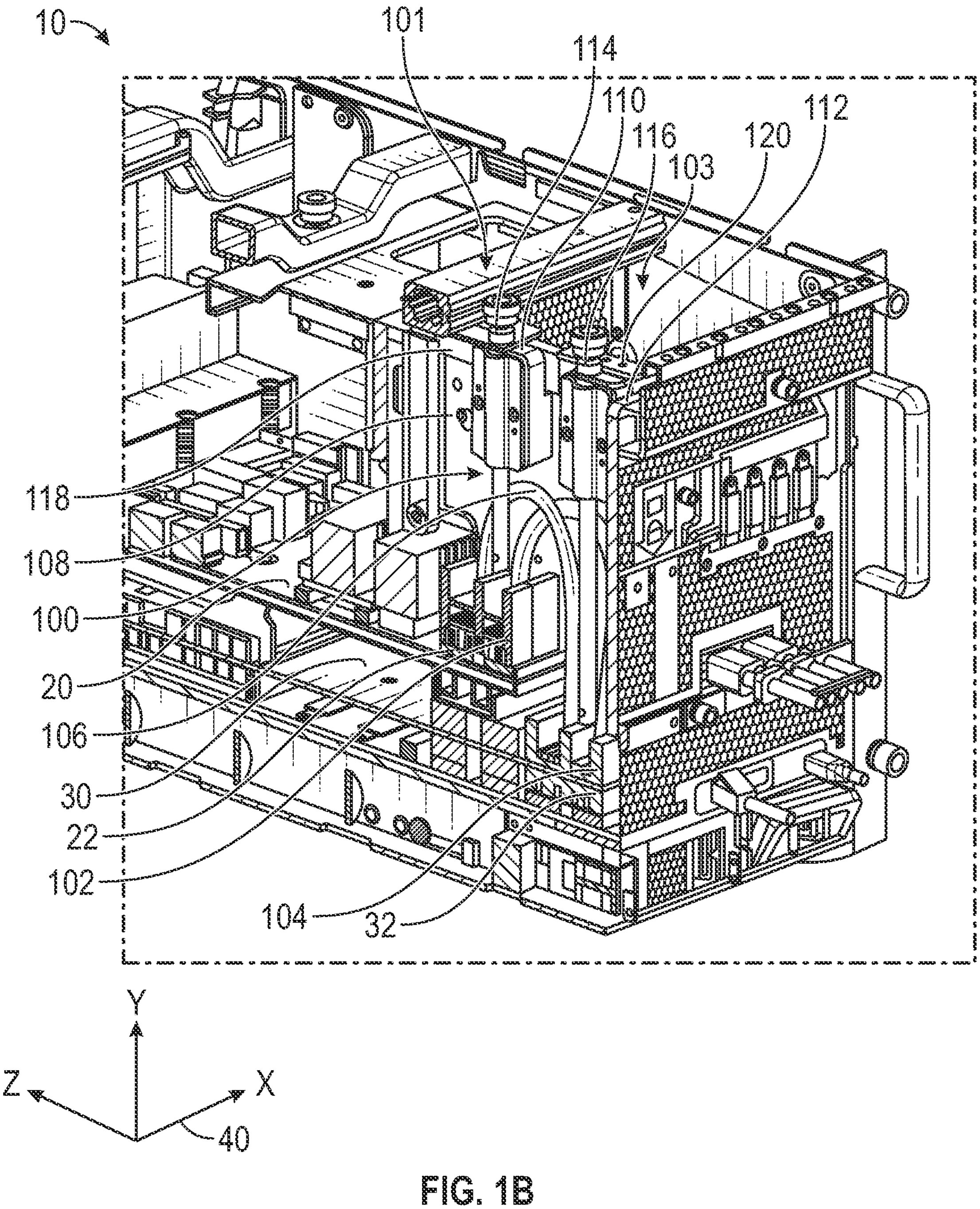
FIG. 1B is a perspective section view of a section of FIG. 1A.

FIG. 1A is a perspective view of an embodiment of a floating interconnect 100 in a server 10. A reference system 40 will be referred to throughout this description. FIG. 1B is a partially-transparent view of a section of FIG. 1A. In FIG. 1B, floating interconnect 100 creates a connection between an upper, first circuit board 20 (e.g., an HIB) with a board connector 22 and a lower, second board 30 (e.g., a mother board) with a board connector 32. Floating interconnect 100 includes a carrier 108, a connector assembly 101, and a connector assembly 103. Carrier 108 includes cam levers 118, 120. Connector assembly 101 includes a connector 102, a tray 110, and a thumbscrew 114. Connector assembly 103 includes a connector 104, a tray 112, and a thumbscrew 116. Connector assemblies 101 and 103 are similar except for the length of the thumbscrew and discussion regarding one connector assembly applies equally to the other. Thus, when fully connected, as shown, cabling 106 completes one or more connections between board connectors 22 and 32. For example, a connection between an HIB and a mother board may be made using a cable with ExaMAX® connectors on both ends.

Figure 2A:
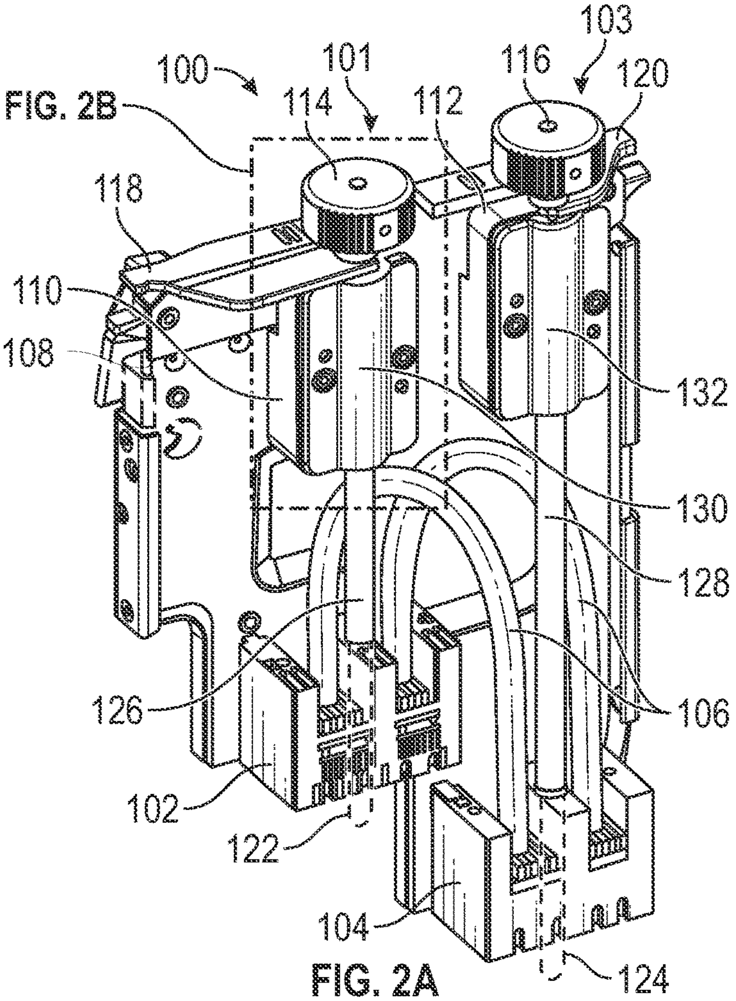
FIG. 2A is an upper front left perspective view of the embodiment of a floating interconnect solution of FIG. 1B.
Figure 2B:
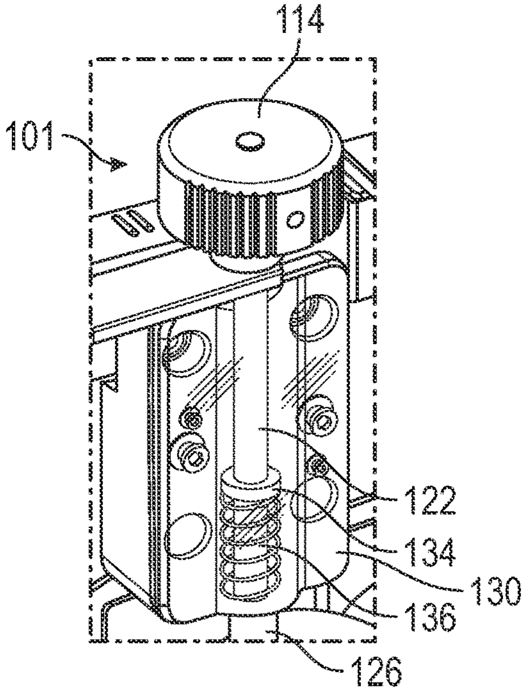
FIG. 2B is a partially-transparent view of a section of FIG. 2A.

FIG. 2A is an upper front left perspective view of the floating interconnect 100 of FIG. 1B. FIG. 2B is a partially-transparent view of a section of FIG. 2A. In FIG. 2A and FIG. 2B, connector assemblies 101, 103 are shown in the fully connected position. Thumb screw 114 includes a thicker section 126 and a thinner section 122, and is retained in tray 110 by a cover 130. Thumb screw 116 includes a thicker section 128 and a thinner section 124, and is retained in tray 112 by a cover 132.

The retention of each thumbscrew within its tray is as follows. A spring 136 is disposed between a flange 134 and the tray such that spring 136, shown compressed, biases thumbscrew 114 toward the extended position. Thus, when thumbscrew 114 is unscrewed from board connector 22, spring 136 will cause thumbscrew 114 to rise in the y direction and withdraw section 122 from connector 102. In some embodiments, section 122 may not be withdrawn completely from connector 102.

Figure 3B:
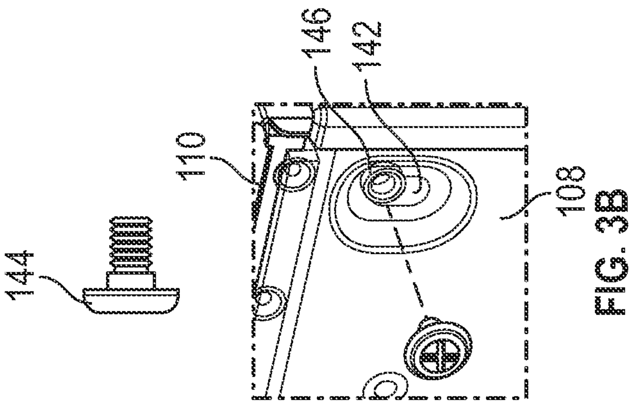
FIG. 3B is a partially-transparent view of a section of FIG. 3A.
Figure 3D:
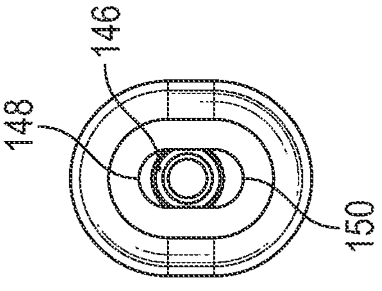
FIG. 3D is a rear view of the section of FIG. 3C in a second state.
Figure 3C:
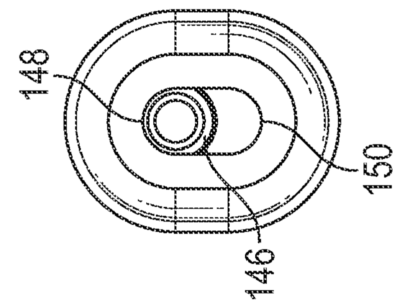
FIG. 3C is a rear view of a section of FIG. 3A in a first state.
Figure 3A:
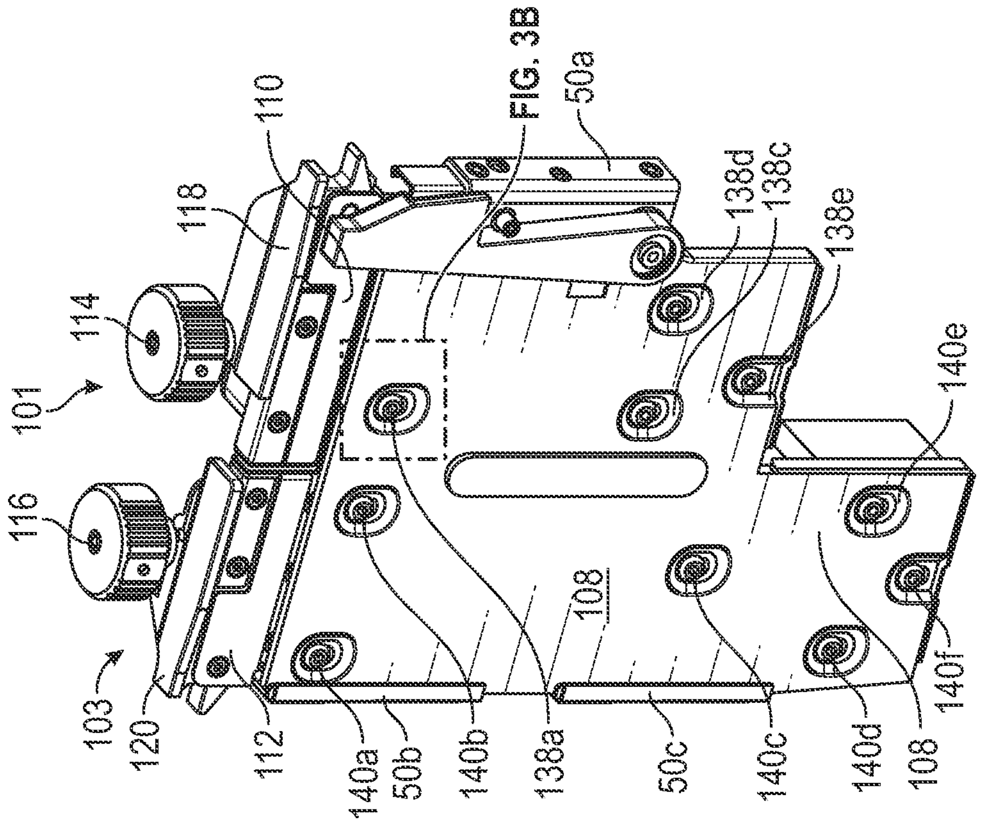
FIG. 3A is an upper rear left perspective view of the embodiment of a floating interconnect solution of FIG. 1B.

FIG. 3A is an upper rear left perspective view of the floating interconnect 100 of FIG. 1B. FIG. 3B is a partially-transparent view of a section of FIG. 3A with tray 110 in a first, raised state. FIG. 3C is a rear view of a section of FIG. 3A in the raised state. FIG. 3D is a rear view of the section of FIG. 3C in a second, lowered state. In FIG. 3A, carrier 108 includes guides 50*a*, 50*b*, 50*c*, which are configured to fit within the slot of server 10. Thus, in embodiments, guides 50 may be modified to fit within slots of different sizes, allowing the remainder of floating interconnect 100 to be used without modification in some circumstances.

Figure 5A:
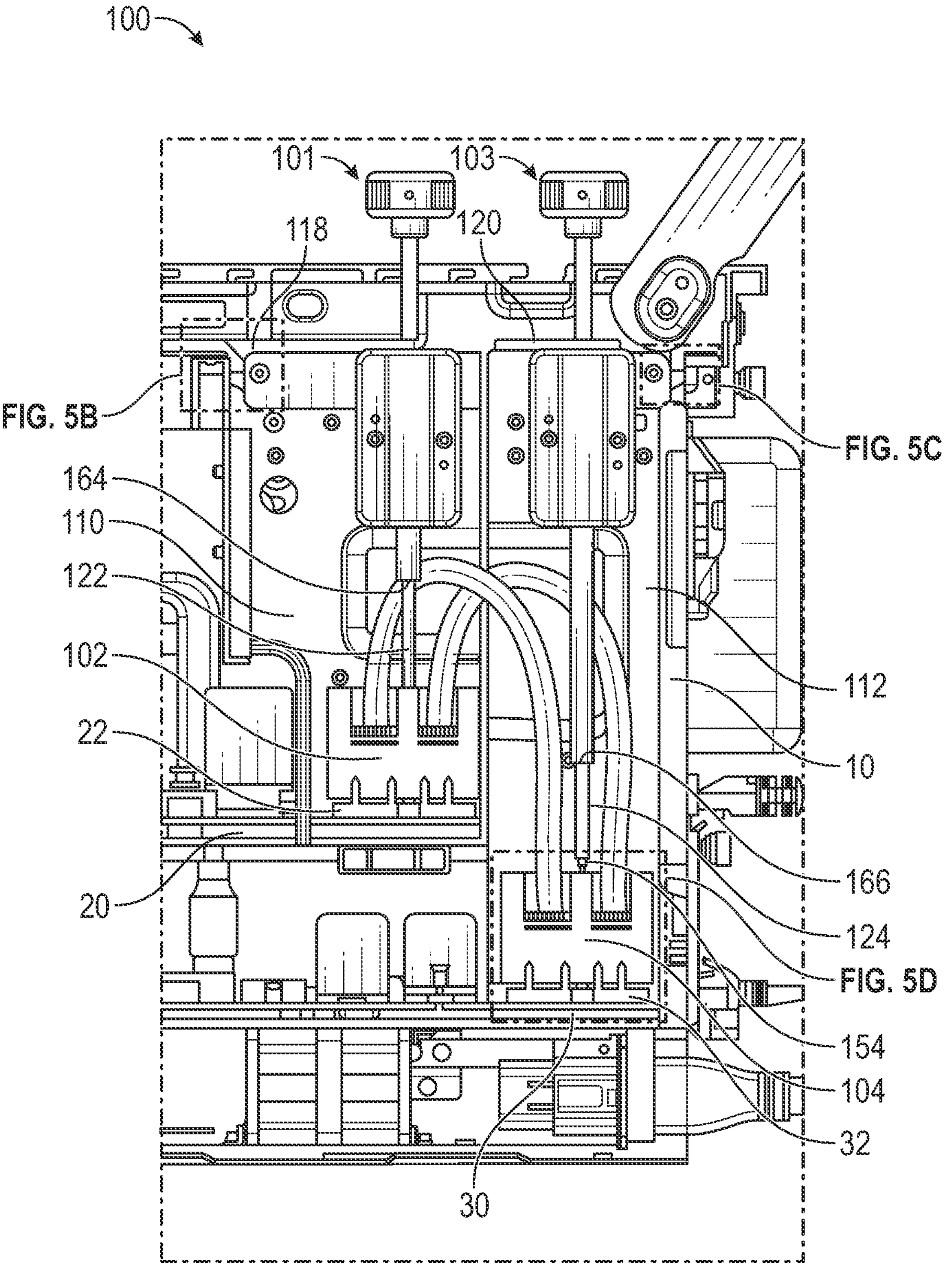
FIG. 5A is a front view of the embodiment of a floating interconnect solution of FIG. 1B in a partially-connected state.

Tray 110 is shown connected to carrier 108 by fasteners 138*a* . . . 138*e* (138*b* is obscured, not shown). Connector 102 is connected directly to carrier 108. Similarly, Tray 112 is shown connected to carrier 108 by fasteners 140*a* . . . 140*f*, and connector 104 is connected directly to tray by fasteners 140*d*, 140*e*, and 140*f*. Thus, trays 110, 112 float independently on carrier 108 in the direction and extent allowed by fasteners 138*a* . . . 138*e* and 140*a* . . . 140*f*. FIG. 5A illustrates that trays 110, 112 are distinct from one another.

As illustrated using fastener 138*a* in FIG. 3B, each fastener includes a T-screw 144 with a standoff. T-screw 144 passes through a slot 142 in carrier 108 into threads 146 within the associated tray or connector. The standoff allows T-screw 144 to slide in the y direction within slot 142 in response to motion of the associated tray or connector. Thus, as shown in FIG. 3C and FIG. 3D, when thumbscrew 114 is screwed into mating connector 22, tray 110 with attached connector 102 may move with respect to carrier 108 from an upper slot end 146 to a lower slot end 142 and, when not abutting upper slot end 146, avoid imparting stress to carrier 108 between the connector and levers 118, 120. Similarly, when thumbscrew 116 is screwed into mating connector 32, tray 112 with attached connector 104 may move with respect to carrier 108 from an upper slot end 146 to a lower slot end 142 and, when not abutting upper slot end 146, avoid imparting stress to carrier 108 between the connector and levers 118, 120.

Figure 4A:
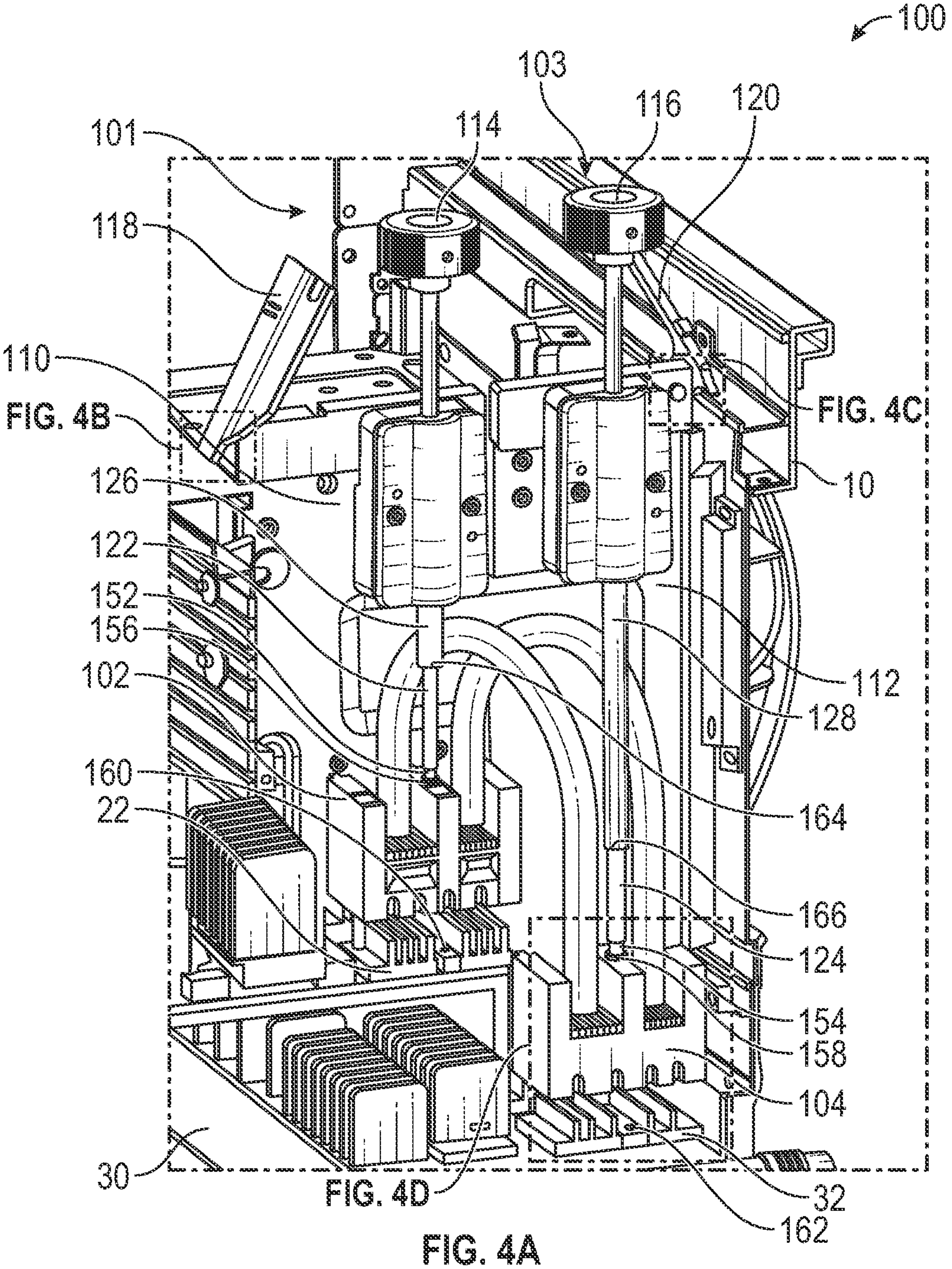
FIG. 4A is an upper front left perspective view of the embodiment of a floating interconnect solution of FIG. 1B in a disconnected state.
Figure 4B:
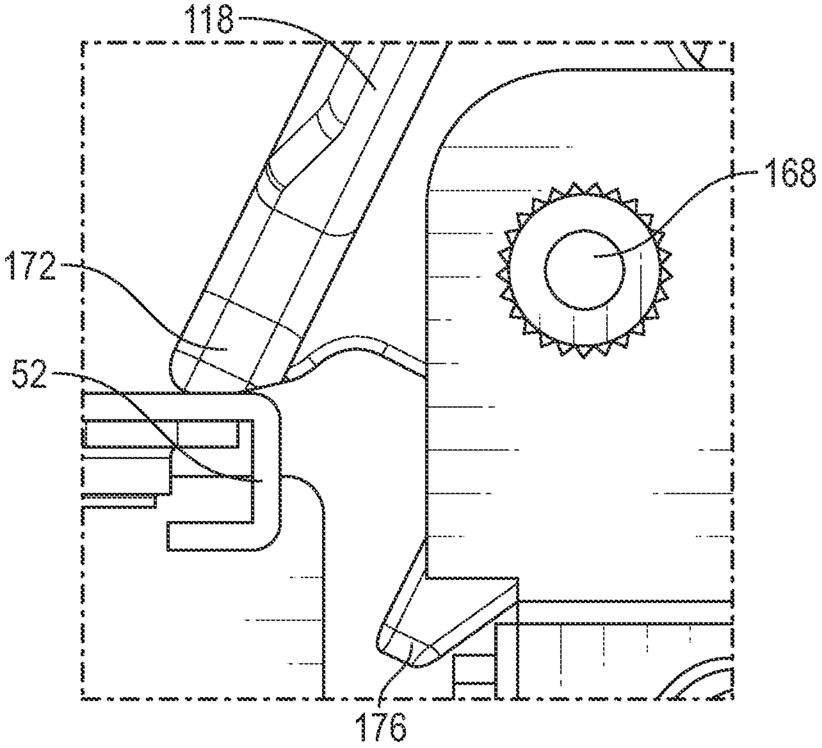
FIG. 4B is a front view of a section of FIG. 4A.
Figure 4C:
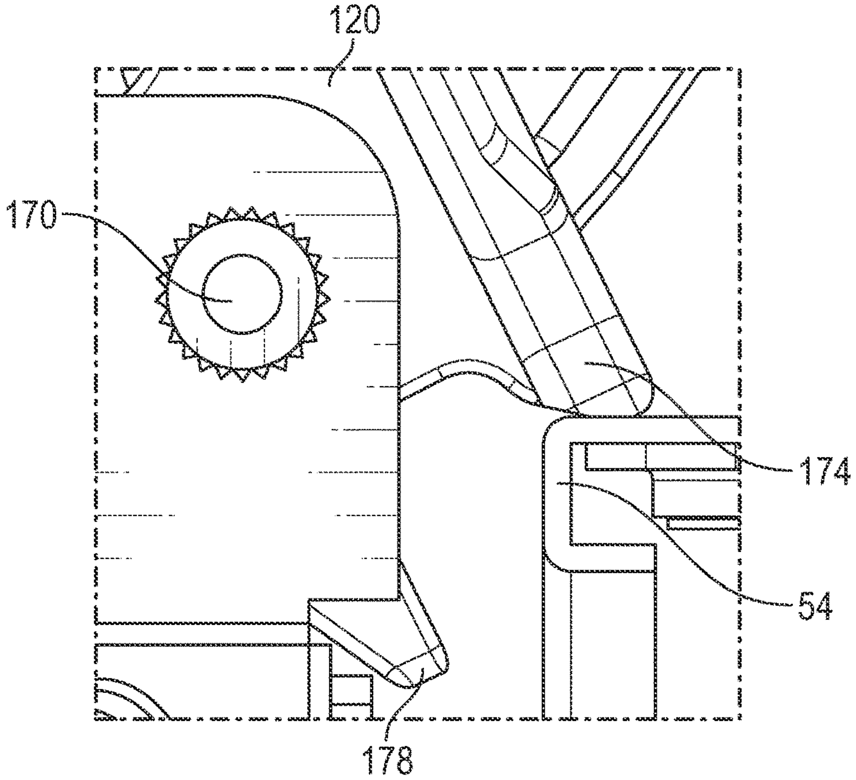
FIG. 4C is a front view of a section of FIG. 4A.
Figure 4D:
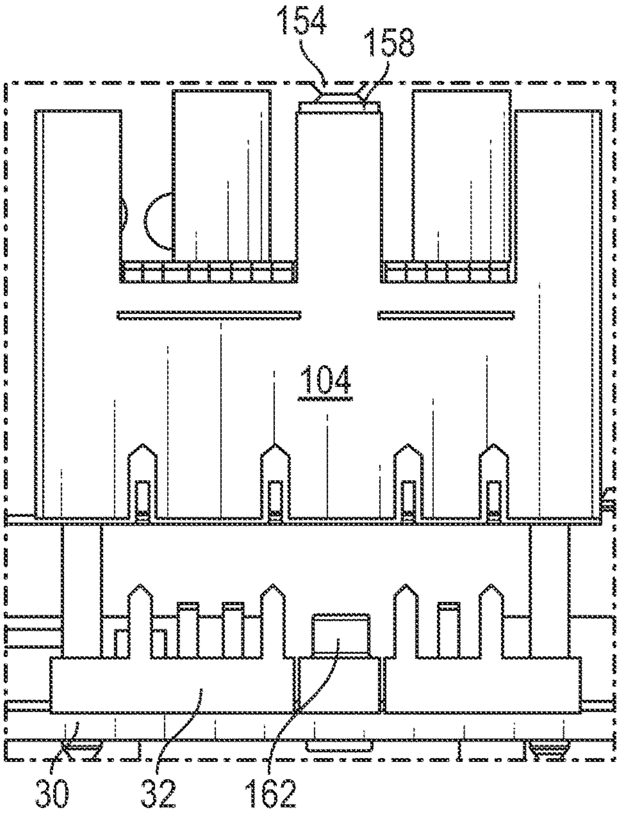
FIG. 4D is a front view of a section of FIG. 4A.

FIG. 4A is an upper front left perspective view of the floating interconnect 100 of FIG. 1B in a disconnected state. FIG. 4B, FIG. 4C, and FIG. 4D are front views of the indicated sections of FIG. 4A. In FIG. 4A, carrier 108 has been lowered into the device slot. This is shown in FIG. 4B and FIG. 4C by an upper cam 172 of lever 118 contacting a lip 52 of the device slot, and an upper cam 174 of lever 120 contacting a lip 54. In this position, connectors 102, 104 are disengaged from connectors 22, 32. Thumbscrews 114, 116 are shown in the extended position caused by bias springs 136, which exposes screw sections 122, 124, in turn revealing threaded ends 152, 154. Thumbscrews 114, 116 each have a thicker section 126, 128, which, when transitioning to thinner sections 122, 124, creates a shoulder 164, 166. Thinner sections 122, 124 are configured to pass through holes 156, 158 in their associated connectors and have threaded ends 152, 154 emerge from the other side. Thus, when carrier 108 is lowered further, threaded ends 152, 154 may engage threaded holes 160, 162 in their associated board connectors. FIG. 4B and FIG. 4C illustrate that levers 118, 120 rotate about a pivot 168, 170, and include a lower cam 176, 178. FIG. 4A and FIG. 4D illustrate that with upper cams 172, 174 just in contact with lips 52, 54, connectors 102, 104 are distanced from connectors 22, 32.

Figure 5B:
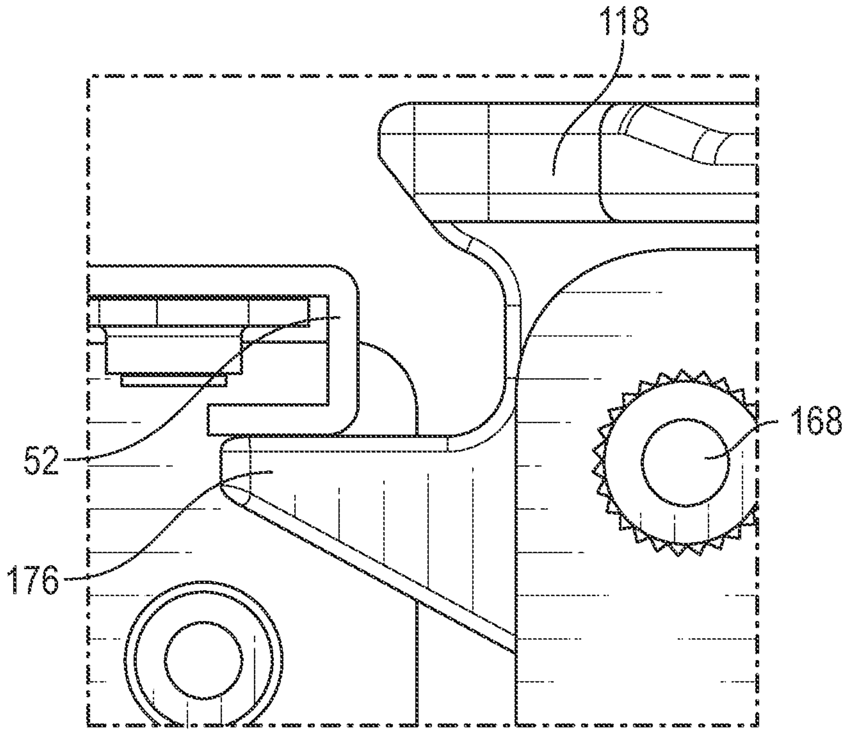
FIG. 5B is a front view of a section of FIG. 5A.
Figure 5C:
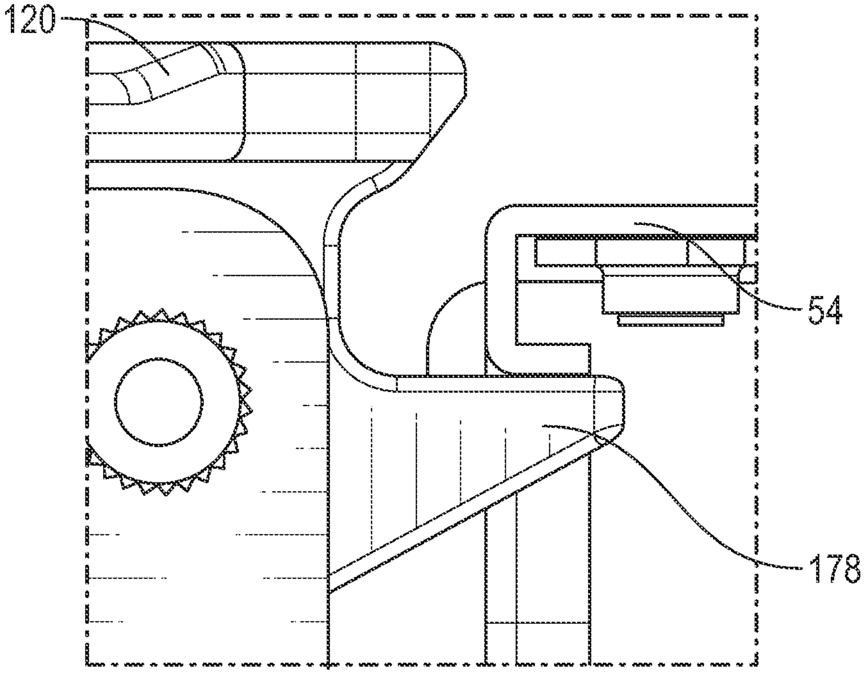
FIG. 5C is a front view of a section of FIG. 5A.
Figure 5D:
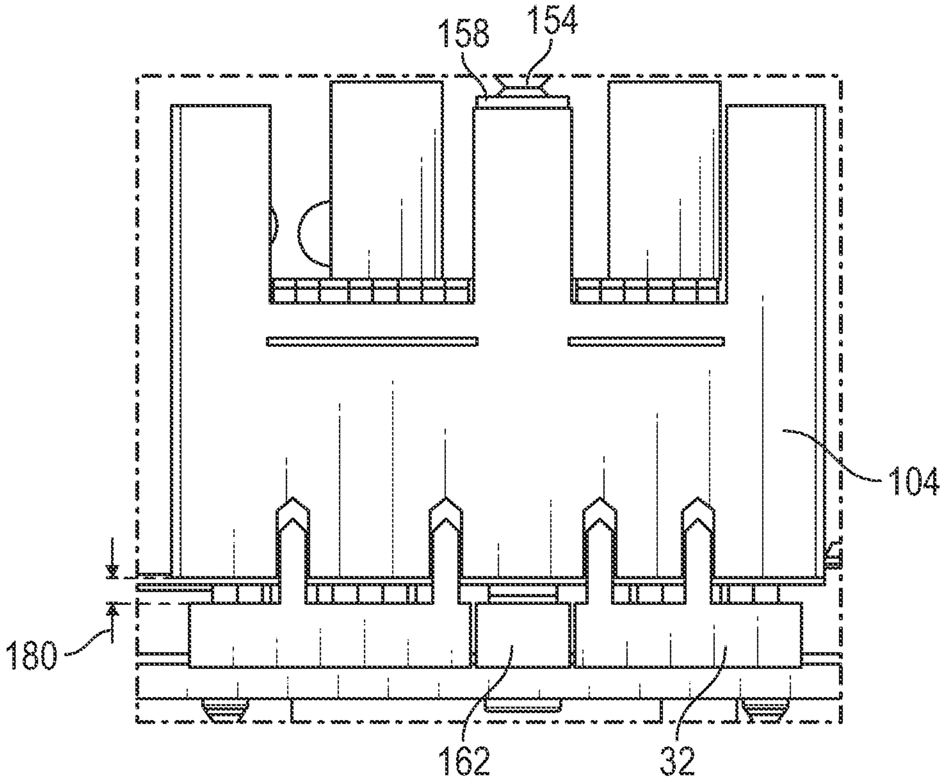
FIG. 5D is a front view of a section of FIG. 5A.

FIG. 5A is a front view of the floating interconnect 100 of FIG. 1B in a partially-connected state. FIG. 5B, FIG. 5C, and FIG. 5D are front views of the indicated sections of FIG. 5A. These figures illustrate the use of levers 118, 120 to initiate the mating of connector 102 to connector 22 and connector 104 to connector 32. As shown in FIG. 5B, FIG. 5C, and FIG. 5D, with levers 118, 120 rotated inwardly, carrier 108 has been driven in the negative y direction, causing connectors 102, 104 to engage their board connectors. While the motion caused by the levers has overcome the initial mating resistance and completed most of the connection, a gap 180 remains between both pairs of connectors, as illustrated in FIG. 5D for connector 104. In this configuration, carrier 108 is compressed between lower cams 176, 178 and connectors 102, 104, since for motion of carrier 108 to drive connectors 102, 104 downward, fasteners 138*c* . . . 138*e* and 142*d* . . . 142*f* will be driven against upper slot end 148. In other embodiments, levers 118, 120 may be configured to fully eliminate gap 180.

Figure 6A:
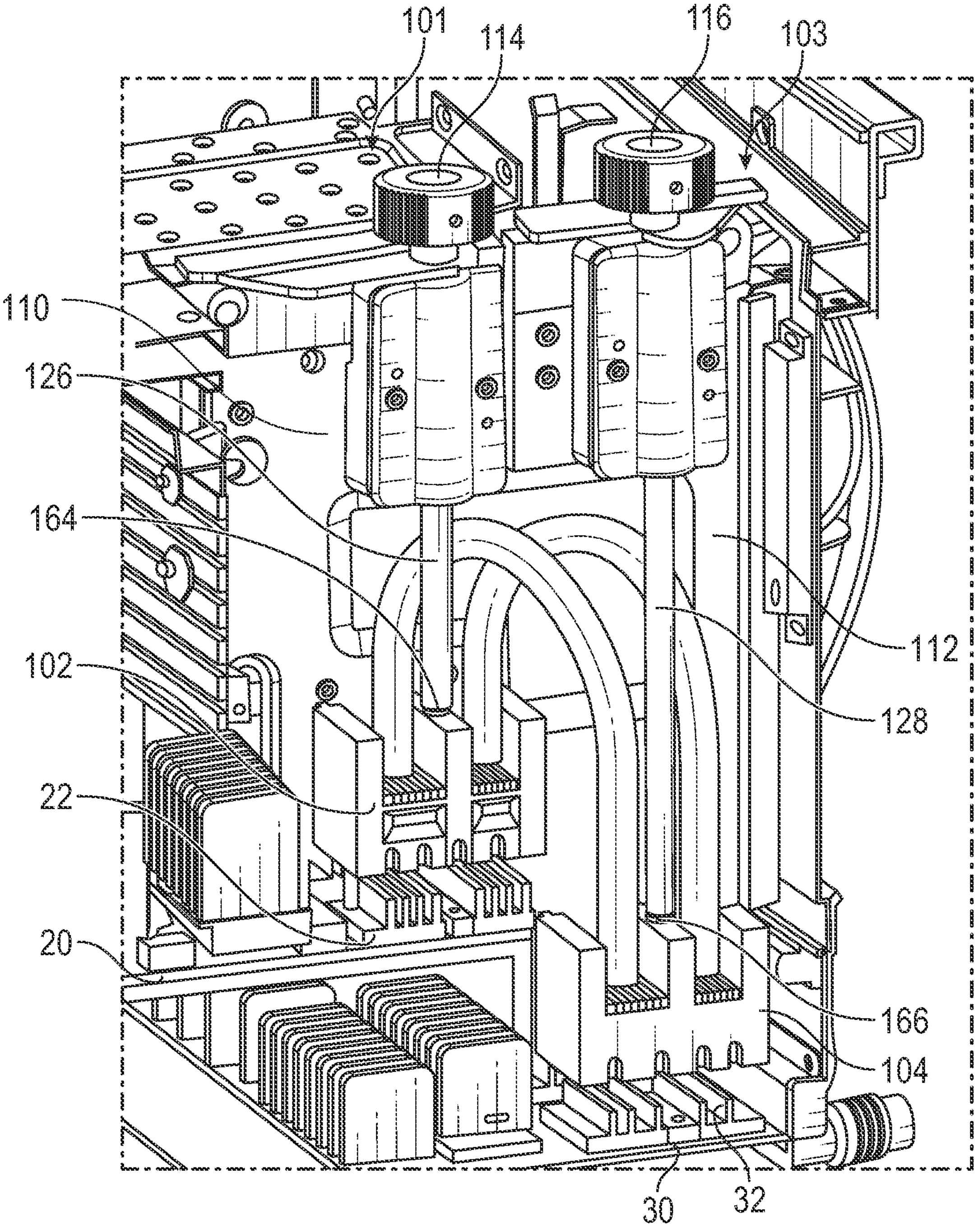
FIG. 6A is an upper front left perspective view of the embodiment of a floating interconnect solution of FIG. 1B in a fully-connected state.
Figure 6B:
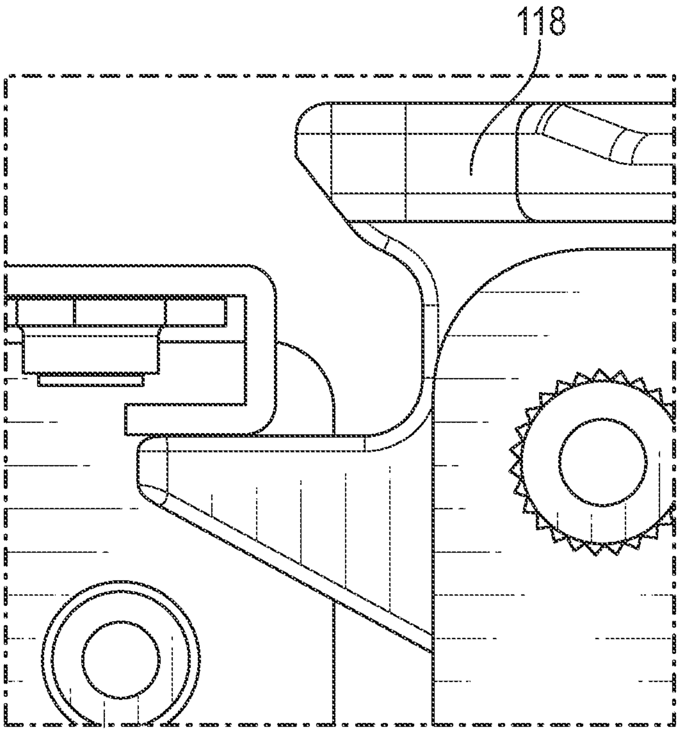
FIG. 6B is a front view of a section of FIG. 6A.
Figure 6C:
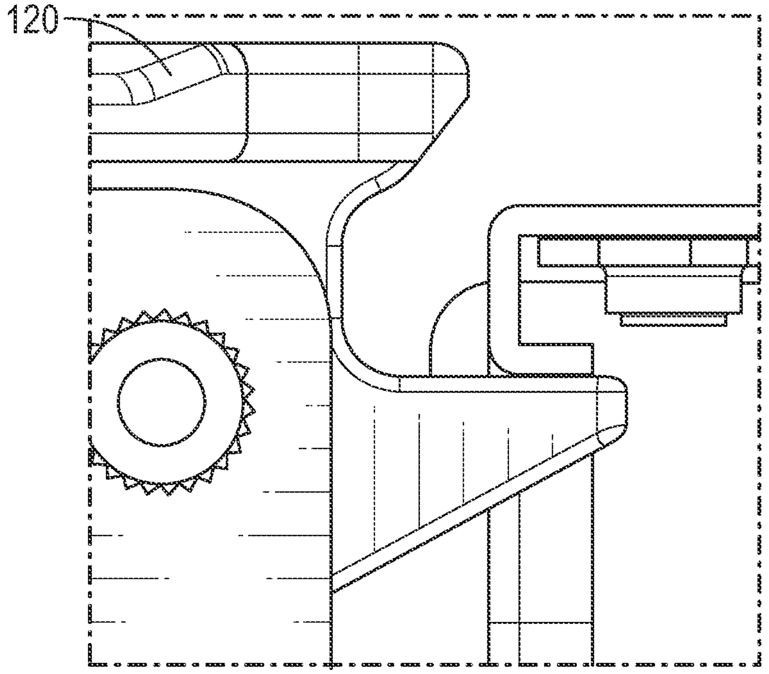
FIG. 6C is a front view of a section of FIG. 6A.
Figure 6D:
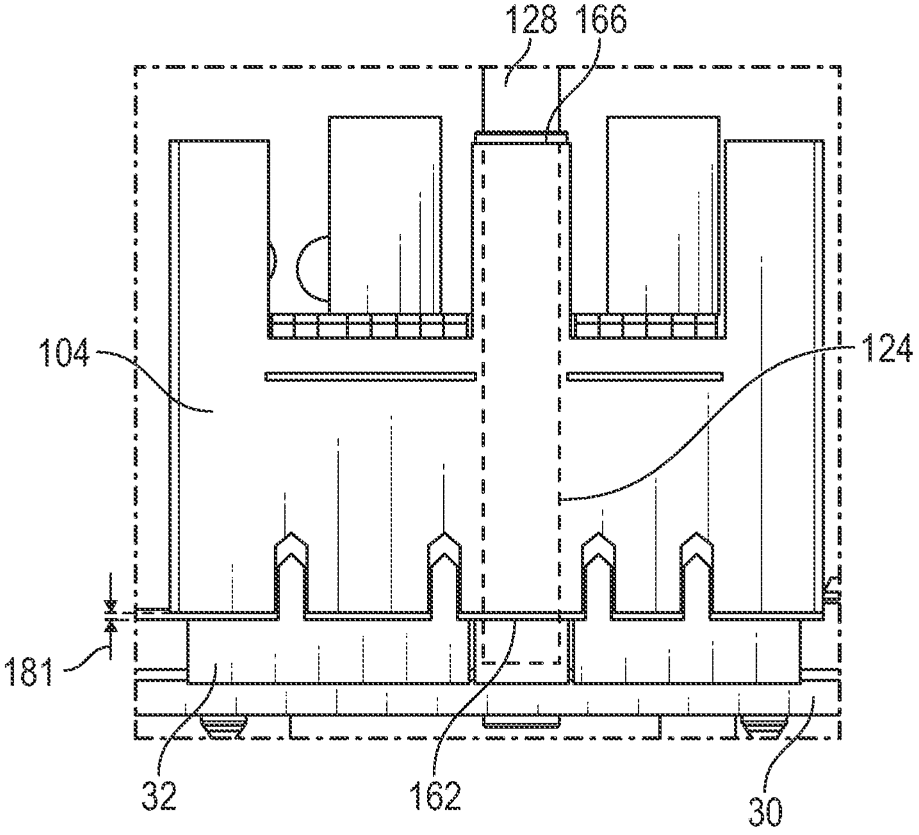
FIG. 6D is a front view of a section of FIG. 6A.

FIG. 6A is an upper front left perspective view of the floating interconnect 100 of FIG. 1B in a fully-connected state. FIG. 6B, FIG. 6C, and FIG. 6D are front views of the indicated sections of FIG. 6A. These figures illustrate that after the rotation of levers 118, 120 has accomplished most of the mating, thumbscrews 114, 116 may be employed to complete the connections, as shown by the minimal or non-existent gap 181 (FIG. 6D). As shown in FIG. 5A, thumbscrews 114, 116 have been pressed down causing thinner sections 122, 124 to enter and pass through holes 156, 158 until shoulders 164, 166 contact connectors 102, 104 and threaded sections 152, 145 (FIG. 4A) to emerge from the other side and into holes 160, 162. With threaded sections 152, 154 within threaded holes 160, 162, thumbscrews 114, 116 may be turned to further engage threaded holes 160, 162. As thinner sections 122, 124 are drawn downward by the further engagement, shoulders 164, 166 firmly seat connectors 102, 104 against connectors 22, 32, as shown in FIGS. 6A and 6B. In seating the connectors using the thumbscrews, carrier 108 has not moved, as shown by there being no change between FIG. 6B and FIG. 6C to FIG. 5B and FIG. 5C. However, connectors 102, 104 have moved downward, as shown by the narrowed or eliminated gap 181, which means there has been relative motion between the connectors and carrier 108. The relative movement between carrier 108 and connectors 102, 104 and trays 110, 112 has been accommodated by fasteners 138 and 140 travelling within slots 142. This movement results in T-screws 144 no longer contacting upper slot edge 148, which correspondingly eliminates any compressive force between lower cams 176, 178 and connectors 102, 104. Thus, the ability of connectors 102, 104 and trays 110, 112 to float eliminates stress in carrier 108.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus comprising:
a carrier plate having a surface;
a first fastener including a first threaded end and a first shoulder;
a first connector slidably connected to the carrier plate such that the first connector is slidable relative to the surface of the carrier plate, wherein, when the carrier plate is engaged within a device slot of a chassis:
the first connector is positioned on the carrier plate such that the first connector opposes a second connector of the chassis; and
the first fastener is extended through the first hole and secured into a first threaded hole in the second connector and causes the first shoulder to abut the first connector and hold the first connector against the second connector.

2. The apparatus of claim 1, further comprising:
a first lever including a first upper tooth and a first lower tooth and pivotably connected to the carrier plate, wherein, when the carrier plate is engaged within the device slot of the chassis:
the first lever is pivoted in a first direction and causes the first lower tooth to engage a first lip of the chassis and drive the carrier plate toward the second connector a first distance causing the first connector to at least partially engage the second connector.

3. The apparatus of claim 2, wherein:
the first connector being connected to the carrier plate includes the first connector being slidably connected to the carrier plate such that, when the first fastener is screwed into the first threaded hole and the first shoulder abuts the first connector and holds the first connector against the second connector, movement of the first connector is not transmitted to the carrier plate.

4. The apparatus of claim 3, wherein:
the carrier plate includes a first slot;
the first connector being connected to the carrier plate includes a third fastener passing through the first slot into the first connector; and
when the first fastener is screwed into the first threaded hole and the first shoulder abuts the first connector and holds the first connector against the second connector, movement of the first connector with respect to the carrier plate is accommodated by the third fastener traveling within the first slot.

5. The apparatus of claim 4, further comprising:
a first tray connected to the first fastener and connected to the carrier plate; wherein:
the first fastener is slidable and rotatable with respect to the first tray.

6. The apparatus of claim 5, wherein:
the first fastener includes a first flange;
a first spring is provided within the first tray and configured to bias the first fastener away from the first connector; and
extending the first fastener through the first hole includes pushing a first fastener head with a force sufficient to overcome the first spring and cause the first fastener to enter the first hole, travel through the first connector, and emerge from the first hole.

7. The apparatus of claim 6, wherein:
the carrier plate includes a second slot;
the first tray being connected to the carrier plate includes a fourth fastener passing through the second slot into the first tray connector; and
when the first fastener is screwed into the first threaded hole and the first shoulder abuts the first connector, the first fastener head abuts the first tray; and
movement of the first tray caused by movement of the first fastener is accommodated by the fourth fastener traveling within the second slot.

8. The apparatus of claim 1, further comprising:
a second fastener including a second threaded end and a second shoulder;
a third connector connected to the carrier plate and including a second hole; and
cabling connecting the first connector and the third connector, wherein, when the carrier plate is within the device slot of the chassis:
the first connector is positioned on the carrier plate such that the first connector opposes the second connector of the chassis;
the third connector is positioned on the carrier plate such that the third connector opposes a fourth connector of the chassis;
the first fastener is extended through the first hole and secured into the first threaded hole in the second connector and causes the first shoulder to abut the first connector and hold the first connector against the second connector;
the second fastener is extended through the second hole and secured into the second threaded hole in the fourth connector and causes the second shoulder to abut the third connector and hold the third connector against the fourth connector; and
the cabling completes a connection between the second connector and the fourth connector.

9. The apparatus of claim 8, further comprising:
a first lever including a first upper tooth and a first lower tooth and pivotably connected to the carrier plate, wherein, when the carrier plate is engaged within the device slot of the chassis:
the connector is pivoted in a first direction and causes the first lower tooth to engage a first lip of the chassis and drive the carrier plate toward the second connector a first distance causing the first connector to at least partially engage the second connector.

10. The apparatus of claim 9, wherein:
the first connector being connected to the carrier plate includes the first connector being slidably connected to the carrier plate such that, when the first fastener is screwed into the first threaded hole and the first shoulder abuts the first connector and holds the first connector against the second connector, movement of the first connector is not transmitted to the carrier plate.

11. The apparatus of claim 10, wherein:
the carrier plate includes a first slot;
the first connector being connected to the carrier plate includes a third fastener passing through the first slot into the first connector; and
when the first fastener is screwed into the first threaded hole and the first shoulder abuts the first connector and holds the first connector against the second connector, movement of the first connector with respect to the carrier plate is accommodated by the third fastener traveling within the first slot.

12. The apparatus of claim 11, further comprising:

a first tray connected to the first fastener and connected to the carrier plate; wherein:

the first fastener is slidable and rotatable with respect to the first tray.

13. The apparatus of claim 12, wherein:

the first fastener includes a first flange;

a first spring is provided within the first tray and configured to bias the first fastener away from the first connector; and extending the first fastener through the first hole includes pushing a first fastener head with a force sufficient to overcome the first spring and cause the first fastener to enter the first hole, travel through the first connector, and emerge from the first hole.

14. The apparatus of claim 13, wherein:

the carrier plate includes a second slot;

the first tray being connected to the carrier plate includes a fourth fastener passing through the second slot into the first connector; and when the first fastener is secured into the first threaded hole and the first shoulder abuts the first connector, the first fastener head abuts the first tray; and movement of the first tray caused by movement of the first fastener is accommodated by the fourth fastener traveling within the second slot.

15. An apparatus comprising: a carrier plate; a first fastener including a first threaded end and a first shoulder; a second fastener including a second threaded end and a second shoulder; a first connector slidably connected to the carrier plate such that the first connector is slidable relative to the surface of the carrier plate; a third connector slidably connected to the carrier plate such that the second connector is slidable relative to the surface of the carrier plate; and cabling connecting the first connector and the third connector, wherein, when the carrier plate is engaged within a device slot of a chassis: the first connector is positioned on the carrier plate such that the first connector opposes a second connector of the chassis; the third connector is positioned on the carrier plate such that the third connector opposes a fourth connector of the chassis; the first fastener is extended through a first hole in the first connector and secured into a first threaded hole in the second connector and causes the first shoulder to abut the first connector and hold the first connector against the second connector; the second fastener is extended through a second hole in the third connector and secured into a second threaded hole in the fourth connector and causes the second shoulder to abut the third connector and hold the third connector against the fourth connector; and the cabling completes a connection between the second connector and the fourth connector.

16. The apparatus of claim 15, further comprising:

a first lever including a first upper tooth and a first lower tooth and pivotably connected to the carrier plate; and a second lever including a second upper tooth and a second lower tooth and pivotably connected to the carrier plate, wherein, when the carrier plate is engaged within the device slot of the chassis:

the first lever and the second lever are pivoted such that the first lower tooth engages a first lip of the chassis and the second lower tooth engages a second lip of the chassis and drive the carrier plate a first distance causing the first connector to at least partially engage the second connector and the third connector to at least partially engage the fourth connector.

17. The apparatus of claim 16, wherein:

the first connector being connected to the carrier plate includes the first connector being slidably connected to the carrier plate such that, when the first fastener is screwed into the first threaded hole and the first shoulder abuts the first connector and holds the first connector against the second connector, movement of the first connector is not transmitted to the carrier plate; and the third connector being connected to the carrier plate includes the third connector being slidably connected to the carrier plate such that, when the second fastener is screwed into the second threaded hole and the second shoulder abuts the third connector and holds the third connector against the fourth connector, movement of the third connector is not transmitted to the carrier plate.

18. The apparatus of claim 17, wherein:

the carrier plate includes a first slot and a second slot;

the first connector being connected to the carrier plate includes a third fastener passing through the first slot into the first connector;

the third connector being connected to the carrier plate includes a fourth fastener passing through the second slot into the third connector;

when the first fastener is screwed into the first threaded hole and the first shoulder abuts the first connector and holds the first connector against the second connector, movement of the first connector with respect to the carrier plate is accommodated by the third fastener traveling within the first slot; and when the second fastener is screwed into the second threaded hole and the second shoulder abuts the third connector and holds the third connector against the fourth connector, movement of the third connector with respect to the carrier plate is accommodated by the fourth fastener traveling within the second slot.

* * * * *